United States Patent
Oh et al.

(10) Patent No.: US 12,060,279 B2
(45) Date of Patent: Aug. 13, 2024

(54) SUPERCRITICAL DRYING METHOD FOR SILICA WET GEL BLANKET

(71) Applicant: LG CHEM, LTD., Seoul (KR)

(72) Inventors: Kyoung Shil Oh, Daejeon (KR); Se Won Baek, Daejeon (KR)

(73) Assignee: LG Chem, Ltd., Seoul (KR)

( * ) Notice: Subject to any disclaimer, the term of this patent is extended or adjusted under 35 U.S.C. 154(b) by 857 days.

(21) Appl. No.: 17/253,384

(22) PCT Filed: Nov. 11, 2019

(86) PCT No.: PCT/KR2019/015273
§ 371 (c)(1),
(2) Date: Dec. 17, 2020

(87) PCT Pub. No.: WO2020/130353
PCT Pub. Date: Jun. 25, 2020

(65) Prior Publication Data
US 2021/0261420 A1    Aug. 26, 2021

(30) Foreign Application Priority Data

Dec. 20, 2018  (KR) .................. 10-2018-0166649

(51) Int. Cl.
*C01B 33/158* (2006.01)
*B01J 13/00* (2006.01)
(Continued)

(52) U.S. Cl.
CPC ....... *C01B 33/1585* (2013.01); *B01J 13/0091* (2013.01); *C01B 33/1417* (2013.01); *F26B 3/02* (2013.01)

(58) Field of Classification Search
None
See application file for complete search history.

(56) References Cited

U.S. PATENT DOCUMENTS

| 2001/0034375 A1 | 10/2001 | Schwertfeger et al. |
| 2004/0112865 A1 | 6/2004 | McCullough et al. |

(Continued)

FOREIGN PATENT DOCUMENTS

| CN | 1498931 | * | 5/2004 |
| CN | 1626440 |   | 6/2005 |

(Continued)

OTHER PUBLICATIONS

"Carbonization of Ammonium Bicarbonate Production With Double Pressurized Process," Jiangsu Bureau of Combustible Chemicals, Petrochemical Industry Press, May 1976, pp. 39-44.

(Continued)

*Primary Examiner* — Sheng H Davis
(74) *Attorney, Agent, or Firm* — Bryan Cave Leighton Paisner LLP

(57) ABSTRACT

Provided is a supercritical drying method of a silica wet gel blanket and a method for producing a silica aerogel blanket including the same, the supercritical drying method preventing a salt from being accumulated inside equipment during supercritical drying. By preventing a salt from being accumulated inside equipment during supercritical drying, it is possible to improve the operational stability of the supercritical drying process. In addition, since only a line filter needs to be separated and is easily washed, the time required for washing and the total amount of ammonia wastewater generated therefrom can be reduced, thereby improving efficiency and reducing costs.

7 Claims, 2 Drawing Sheets

(51) Int. Cl.
    *C01B 33/141* (2006.01)
    *F26B 3/02* (2006.01)

(56) References Cited

U.S. PATENT DOCUMENTS

| | | |
|---|---|---|
| 2018/0134566 A1 | 5/2018 | Kim et al. |
| 2018/0134567 A1 | 5/2018 | Grandi et al. |
| 2018/0179073 A1 | 6/2018 | Oh et al. |
| 2019/0062167 A1 | 2/2019 | Kim et al. |
| 2019/0276322 A1 | 9/2019 | Kim et al. |
| 2019/0375644 A1 | 12/2019 | Grandi et al. |
| 2020/0331766 A1 | 10/2020 | Oh et al. |

FOREIGN PATENT DOCUMENTS

| | | | |
|---|---|---|---|
| CN | 1636871 A | | 7/2005 |
| CN | 102020284 | * | 4/2011 |
| CN | 103523789 A | | 1/2014 |
| CN | 108290745 | * | 7/2018 |
| CN | 108473321 | * | 8/2018 |
| EP | 3284721 A1 | | 2/2018 |
| EP | 3375757 A1 | * | 9/2018 .......... B01J 13/0091 |
| JP | 11335115 | * | 12/1999 |
| JP | H11-335115 | | 12/1999 |
| JP | 2005-116757 | | 4/2005 |
| JP | 2013-067521 | | 4/2013 |
| KR | 100837189 | * | 6/2008 |
| KR | 10-1748527 | | 6/2017 |
| KR | 10-2017-0104956 | | 9/2017 |
| KR | 10-2018-0033064 | | 4/2018 |
| KR | 10-2018-0050607 | | 5/2018 |
| KR | 10-2018-0166649 | | 12/2018 |
| WO | 2017-095527 | | 6/2017 |
| WO | 2017159968 | * | 9/2017 |
| WO | 2018-208005 | | 11/2018 |
| WO | 2018208005 | * | 11/2018 |
| WO | 2019-098504 | | 5/2019 |

OTHER PUBLICATIONS

Zheng et al., "High Synthesis Chemistry—Method and Practice," Beijing, National Defense Industry Press, 2018, pp. 80-81 [English Language Machine Translation and Original Document in Chinese included].

* cited by examiner

SUPERCRITICAL DRYING METHOD FOR SILICA WET GEL BLANKET

CROSS-REFERENCE TO RELATED APPLICATIONS

This application is a National Stage Application of International Application No. PCT/KR2019/015273 filed on Nov. 11, 2019, which claims the benefit of Korean Patent Application No. 10-2018-0166649, filed on Dec. 20, 2018, in the Korean Intellectual Property Office, the disclosure of which is incorporated herein in its entirety by reference.

TECHNICAL FIELD

The present invention relates to a supercritical drying method for a silica wet gel blanket and a method for producing a silica 1 blanket using the supercritical drying method, the supercritical drying method preventing a salt from being accumulated inside a facility during supercritical drying.

BACKGROUND

Aerogel is a highly porous material composed of nanoparticles, and has high porosity, specific surface area, and low thermal conductivity, thereby attracting attention as a thermal insulation material, a soundproofing material, and the like of high efficiency. However, since such aerogel has very low mechanical strength due to the porous structure thereof, an aerogel composite in which aerogel is bonded to a fibrous blanket by being impregnated therewith, the fibrous blanket such as an inorganic fiber or an organic fiber, both of which are conventional heat insulation fibers, has been developed.

Among these materials, silica aerogel is a highly porous material having high porosity and specific surface area, so that the application there of in various fields, such as in a thermal insulation material, a catalyst, a sound absorbing material, an interlayer insulation material for a semiconductor circuit, and the like are expected. Although the rate of silica aerogel being commercialized is very slow due to the complex manufacturing process and low mechanical strength thereof, the steady research on the silica aerogel has resulted in the release of early application products, and the market expansion thereof is gradually increasing including an insulation material market. Since the silica aerogel has very low mechanical strength due to the porous structure thereof, the silica aerogel is typically combined with a substrate such as glass fiber, ceramic fiber, or polymer fiber and commercialized in the form of such as a silica aerogel blanket or silica aerogel sheet.

For example, a silica aerogel blanket using silica aerogel is manufactured through steps of gelation, aging, surface modification, and drying of silica sol.

In the gelation step and the aging step, a basic catalyst is typically used, and when a surface modifier used in the following surface modification step is decomposed, ammonia and the like can be generated. As described above, in the steps before supercritical drying, ammonia is inevitably generated, and the ammonia is reacted with carbon dioxide used as a supercritical fluid in a high-pressure supercritical drying step performed after preparing silica wet gel, resulting in the generation of an ammonium salt, such as ammonium carbonate or ammonium bicarbonate.

Since such salt is insoluble, there is a possibility in that the salt is accumulated in a supercritical extractor pipe line, a line to which a pressure control valve is connected, or the like inside a facility during supercritical drying, thereby blocking a pipe. When the salt continues to accumulate on the inner wall of the line, the salt may pose a threat to safety under high pressure driving conditions. In addition, the salt generates odors, making the working environment poor.

Typically, in order to solve the above problems, a treatment method for removing a salt generated in a supercritical drying step was devised. However, the method requires separate facility other than a supercritical drying device, and requires an additional washing process, so that there is a difficulty in applying the method when a supercritical drying process is successively performed.

In addition, in order to fundamentally block the reaction between ammonia and carbon dioxide, an air stripping method, a reduced pressure distillation method, and the like for removing the ammonia after the surface modification step and before the supercritical drying step have been attempted. However, the methods not only require a separate device but also longer processing time, so that the methods are inefficient in terms of the economic and temporal aspects of a supercritical drying process.

Thus, there is still a need for the development of a method for easily and effectively removing a salt which is generated during a supercritical drying step.

PRIOR ART DOCUMENT

Patent Document (Patent Document 1) JP 2005-116757 A.

BRIEF DESCRIPTION

Technical Problem

An aspect of the present invention is to prevent the deterioration in efficiency of a supercritical drying process due to a salt generated during the supercritical drying of a silica aerogel blanket, and specifically, to provide a supercritical drying method which induces salt generation due to the reaction of residual materials discharged after the supercritical drying process to occur in a separate line filter.

Another aspect of the present invention is to provide a method for manufacturing a silica aerogel blanket using the supercritical drying method for a silica wet gel blanket.

Yet another aspect of the present invention is to provide a supercritical drying device to be used in the supercritical drying method of a silica wet gel blanket.

Technical Solution

According to an aspect of the present invention, there is provided a method including a) placing a silica wet gel blanket inside a supercritical extractor, b) subjecting the silica wet gel blanket to supercritical drying and discharging residual materials, and c) injecting the residual materials into a line filter installed between the supercritical extractor and a pressure control valve and then discharged the same, wherein the step b) and the step c) are sequentially or simultaneously performed, and the step c) is filtering a salt generated by a reaction among the residual materials inside the line filter.

According to another aspect of the present invention, there is provided a method including 1) preparing a silica sol, 2) impregnating the silica sol in a blanket base material and then subjecting the impregnated silica sol to gelation to produce a silica wet gel blanket, 3) subjecting the silica wet gel blanket to surface modification, and 4) subjecting the surface-modified silica wet gel blanket to supercritical drying, wherein the supercritical drying step is performed by the supercritical drying method of the present invention.

According to yet another aspect of the present invention, there is provided a supercritical drying device including a supercritical s extractor in which supercritical drying is performed, a line filter connected to the supercritical extractor, and a pressure control valve connected to the line filter.

Advantageous Effects

According to the supercritical drying method of the present invention, by preventing a salt from being accumulated inside a facility during supercritical drying, it is possible to improve the operation stability of a supercritical drying process.

In addition, according to the supercritical drying method of the present invention, since only a line filter can be separated and easily washed, the amount of time washing and the amount of ammonia wastewater generated from the washing can be reduced, thereby improving efficiency and reducing costs.

In addition, according to the supercritical drying method of the present invention, the density of ammonium ions included in a recovered solvent is reduced, thereby facilitating the re-use of the solvent.

Furthermore, it is possible to manufacture a silica aerogel blanket having uniform physical properties using the supercritical drying method.

DETAILED DESCRIPTION

Figure 1:
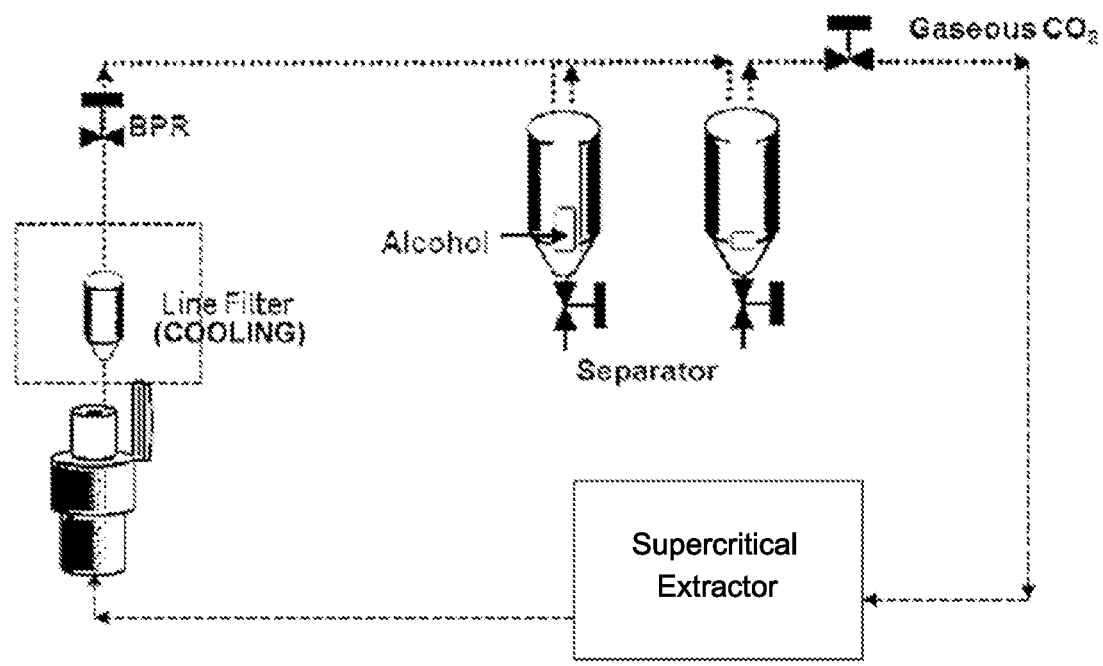
FIG. 1 shows a supercritical drying device used in a supercritical drying method according to an embodiment of the present invention.

Hereinafter, the present invention will be described in more detail to facilitate understanding of the present invention.

It will be understood that words or terms used in the description and claims of the present invention shall not be construed as being limited to having the meaning defined in commonly used dictionaries. It will be further understood that the words or terms should be interpreted as having meanings that are consistent with their meanings in the context of the relevant art and the technical idea of the invention, based on the principle that an inventor can properly define the meaning of the words or terms to best explain the invention.

Supercritical Drying Method for Silica Wet Gel Blanket

The present invention provides a supercritical drying method for a silica wet gel blanket including a) placing the silica wet gel blanket inside a supercritical extractor, b) subjecting the silica wet gel blanket to supercritical drying and discharging residual materials from the supercritical extractor, and c) injecting the residual materials into a line filter installed between the supercritical extractor and a pressure control valve to form a filtered residual material, and then discharging the filtered residual material, wherein the step b) the and step c) are sequentially or simultaneously performed, and the step c) is filtering a salt generated by a reaction among the residual materials inside the line filter.

Step a)

The step a) is a step for placing a silica wet gel blanket inside a supercritical extractor. The supercritical extractor means a high-pressure device in which supercritical drying of the silica wet gel blanket is performed using a supercritical fluid.

The silica wet gel blanket means a silica wet gel blanket prepared by impregnating a silica sol and a gelation catalyst solution to a blanket base material to complete a gelation reaction, and then subjecting the silica sol and the gelation catalyst solution impregnated to the blanket base material to an aging step and a surface modification step to make the surface hydrophobic.

As a method for manufacturing the silica wet gel blanket, steps prior to a supercritical drying step can freely use methods typically used in the art. Specifically, the present invention can use a gelation step, an aging step, a surface modification step to be described later, and using a basic catalyst and/or silazane-based surface modifier in the above steps is more suitable for the present invention.

Step b)

The step b) is a step for subjecting the silica wet gel blanket to supercritical drying and discharging residual materials. Specifically, the step b) can be performed by substituting a solvent inside the silica wet gel blanket with carbon dioxide using carbon dioxide as the supercritical fluid, and drying the silica wet gel blanket at a temperature and pressure above a critical point of the carbon dioxide.

As the supercritical fluid, a freon such as $SF_6$, $CHF_3$, and $CHF_2OCF_3$, $N_2O$, an alcohol, a ketone, carbon dioxide ($CO_2$), or the like can be used. However, the present invention can be a supercritical drying method using carbon dioxide as a supercritical fluid.

Carbon dioxide is in a gaseous state at room temperature and atmospheric pressure. However, when a temperature and pressure exceed a predetermined temperature and pressure limit called a supercritical point, the evaporation process does not occur so that carbon dioxide achieves a critical state in which gas and liquid cannot be distinguished. Carbon dioxide in a critical state is referred to as a supercritical carbon dioxide. The supercritical carbon dioxide has a molecular density close to that of a liquid, however, has a low viscosity, thereby having properties close to those of gas. Therefore, a supercritical carbon dioxide has a high diffusion rate and a high thermal conductivity so that drying efficiency thereof is high, and drying process time can be shortened.

According to an embodiment of the present invention, the step b) includes a solvent substitution process in which carbon dioxide in a liquid state is filled inside the supercritical extractor in which the silica wet gel blanket is placed, and substituting the solvent inside the silica wet gel blanket with the carbon dioxide. Thereafter, in order to make carbon dioxide to be in a supercritical state, the temperature is raised to 40-70° ° C. at a predetermined temperature raising rate, specifically, 0.1-1° C./min, and the carbon dioxide is allowed to remain at a pressure greater than the pressure at which carbon dioxide becomes supercritical, specifically, at a pressure of 100-150 bar for 2 hours to 12 hours, more specifically for 2 hours to 6 hours.

According to an embodiment of the present invention, an atmospheric pressure drying step can be further included after the supercritical drying. The above atmospheric pressure drying step is a step that can be optionally added to remove a small amount of residual solvent which has not been completely removed in the supercritical drying step and to more effectively remove a salt which can be generated when ammonia and carbon dioxide meet inside the gel during supercritical drying.

When the supercritical drying method for a silica wet gel blanket of the present invention additionally perform the atmospheric pressure drying step, the atmospheric drying loss of the present invention can be 5 wt % or less. The atmospheric pressure drying loss represents a weight change rate before and after the atmospheric pressure drying performed additionally to remove the residual solvent present in the silica aerogel after the supercritical drying step, and can be calculated from the equation below.

Atmospheric pressure drying loss (weight %) [(aerogel blanket weight after supercritical drying−aerogel blanket weight after supercritical drying and additional atmospheric pressure drying)/(aerogel blanket weight after supercritical drying)]×100

Step c)

The step c) is a step for injecting the residual materials into a line filter installed between the supercritical extractor and a pressure control valve. Specifically, the step c) is a step for filtering a salt generated by a reaction among the residual materials inside the line filter.

According to an embodiment of the present invention, the residual materials include ammonia, carbon dioxide, a solvent, and water.

The ammonia is generated during a process for producing a silica wet gel, and as described above, the ammonia can be derived from a basic catalyst of the gelation step and/or the aging step, or can be generated when a surface modifier is decomposed in the case in which a silazane-based compound is used as the surface modifier in the surface modification step.

In addition, the residual materials can include carbon dioxide used as supercritical fluid, a solvent discharged by a solvent substitution process in a supercritical extraction step, and water contained therein by using a polar solvent as the solvent.

In a typical supercritical drying method, after the supercritical drying of a silica wet gel blanket in a supercritical extractor, residual materials discharged from the supercritical extractor, for example, carbon dioxide in a supercritical state, ammonia release from inside a gel, a solvent substituted with carbon dioxide during the supercritical drying, water, and the like are discharged from the supercritical extractor and flow along a line. While passing through a pressure control valve, carbon dioxide is changed from being in a supercritical state to be in a gaseous state and the solvent is recovered in a separator.

During the above process, ammonia, carbon dioxide, and water which are included in the residual materials discharged from the supercritical extractor are reacted to generate ammonium bicarbonate ($NH_4$)$HCO_3$ and through an additional reaction, ammonium carbonate, ($NH_4$)$_2CO_3$ can also be generated. The ammonium bicarbonate and ammonium carbonate are insoluble salts of white or translucent agglomerates, crystals, or powders which are accumulated inside the line when passing through the pressure control valve, thereby inhibiting smooth flow, and also cause the unique odor of ammonia.

In the present invention, by installing a line filter between a supercritical extractor and a pressure control valve, a salt generated from residual materials are filtered in the line filter before reaching the pressure control valve, and thus, the salt is prevented from being accumulated in other pipes of a supercritical drying device, let alone in the pressure control valve.

The step b) and the step c) described above can be sequentially or simultaneously performed. In a supercritical drying process successively performed, it is possible to filter a salt in a line filter, the salt generated from residual materials continuously discharged (step c) while supercritical drying a silica wet gel blanket in a supercritical extractor (step b). It can be preferable to perform the two steps at the same time from the efficiency point of view of the supercritical drying process.

The line filter of the step c) includes a filtration membrane for filtering a salt, and the average pore diameter of the filtration membrane can be 1-100 μm, preferably 10-90 μm, and more preferably 20-50 μm.

The filtration membrane is to filter the salt generated by the reaction among residual materials discharged from the supercritical extractor, and it is preferable that the filtration membrane has a diameter of a size which prevents an ammonium bicarbonate salt and an ammonium carbonate salt from passing therethrough.

When the pore diameter is less than 1 μm, a salt can be excessively accumulated in the filtration membrane to cause a problem of interfering with the flow of carbon dioxide. When the pore diameter is greater than 100 μm, a salt is not collected in the filtration membrane but mostly pass therethrough to cause a problem of not implementing the effect of the present invention.

The outer surface temperature of the line filter can be 0-50° ° C., 0-30° C., preferably 0-20° ° C., and more preferably 0-15° C.

When the temperature is lower than 0° ° C., too much energy is consumed for heating in order to increase the temperature which has been lowered after passing the pressure control valve. When the temperature is higher than 50° C., the formation of a salt in the line filter is not facilitated, so that the generation and accumulation of a salt in a pipe at another location may not be effectively prevented.

The aforementioned reaction of ammonia, carbon dioxide, and water actively occurs at low temperatures. Particularly, the ammonium bicarbonate salt and the ammonium carbonate salt, and the like are easily decomposed in an environment with heat even after being generated.

In the present invention, even if the temperature of the line filter is not cooled in accordance with the ambient temperature, the internal temperature of the line filter is lowered due to the pressure drop in the line filter. Thus, the residual materials discharged from the supercritical extractor form salts while passing through the line filter, and the salts are accumulated in the filtration membrane. Relatively, the amount of salts accumulated in another pipe of the supercritical drying device is significantly reduced.

In addition, in order to maximize the advantages of the present invention by allowing a greater amount of salt to be generated in the line filter, it is important to set the internal and external temperatures of the line filter to a low temperature to promote the generation of an ammonium bicarbonate salt, an ammonium carbonate salt, and the like. Specifically, the outer surface temperature of the line filter after cooling can be 0-50° C., 0-30° C., preferably 0-20° ° C., and more preferably 0-15° C.

When the supercritical drying method of the present invention is used, the amount of the ammonium ions ($NH_4^+$) included in a solvent recovered after completing the supercritical drying method can be 30-300 mg/kg, preferably 30-150 mg/kg, more preferably 30-100 mg/kg, and yet more preferably 30-50 mg/kg.

When the supercritical drying method of the present invention is used, a large amount of salt is generated and filtered in the line filter, and thus, there is little ammonia, that is, ammonium ions, present in the flow after passing the line filter. Therefore, the amount of ammonium ions remaining in the recovered solvent is also significantly reduced, thereby facilitating the re-use of the solvent.

In addition, when the supercritical drying method of the present invention is used, unlike a typical method in which a salt is accumulated inside the entire supercritical drying device so that the device has to be washed after a supercritical drying process is completed, only a line filter needs to be separated and washed.

Therefore, not only the user convenience is improved but also there are advantages in environment protection and efficiency since the total amount of ammonia wastewater generated during the washing process is also reduced.

Method for Manufacturing Silica Aerogel Blanket

The present invention provides a method for producing a silica aerogel blanket, the method including 1) preparing a silica sol, 2) impregnating the silica sol in a blanket base material and then subjecting the impregnated silica sol to gelation to produce a silica wet gel blanket, 3) subjecting the silica wet gel blanket to surface modification, and 4) subjecting the surface-modified silica wet gel blanket to supercritical drying.

The supercritical drying is performed by the supercritical drying method described above.

Step 1)

The step 1) is a step for preparing a silica sol, wherein the silica sol can be prepared by mixing a silica precursor, alcohol, and an acidic aqueous solution.

The silica precursor can be an alkoxide-based compound containing silicon, and can specifically be tetraalkyl silicate such as tetramethyl orthosilicate (TMOS), tetraethyl orthosilicate (TEOS), methyl triethyl orthosilicate, dimethyl diethyl orthosilicate, tetrapropyl orthosilicate, tetraisopropyl orthosilicate, tetrabutyl orthosilicate, tetra secondary butyl orthosilicate, tetra tertiary butyl orthosilicate, tetrahexyl orthosilicate, tetracyclohexyl orthosilicate, and tetradodecyl orthosilicate. More specifically, the silica precursor can be tetraethyl orthosilicate (TEOS).

The silica precursor can be used in an amount such that the content of silica contained in the silica sol becomes 0.1 wt % to 30 wt %, but the amount of the silica precursor to be used is not limited thereto. If the content of the silica is less than 0.1 wt %, the content of a silica aerogel in a blanket to be finally produced is too low to achieve the desired level of heat insulation effect. If the content of the silica is greater than 30 wt %, due to an excessive formation of a silica aerogel, there is a possibility in that the mechanical properties of the blanket, particularly the flexibility thereof, can deteriorate.

The alcohol can specifically be a monohydric alcohol such as methanol, ethanol, isopropanol, and butanol; or polyhydric alcohol such as glycerol, ethylene glycol, propylene glycol, diethylene glycol, dipropylene glycol, and sorbitol, and any one thereof or a mixture of two or more thereof can be used. Among the above, when considering the miscibility with water and an aerogel, the alcohol can be a monohydric alcohol having 1-6 carbon atoms such as methanol, ethanol, isopropanol, and butanol.

The alcohol (a polar organic solvent) as described above can be used in an appropriate amount by those skilled in the art in consideration of the degree of hydrophobicity in a silica aerogel to be finally produced while promoting a surface modification reaction.

The acidic aqueous solution can promote the gelation of a silica sol to be described later. An acid catalyst contained in the acidic aqueous solution can specifically include one or more kinds of inorganic acid such as nitric acid, hydrochloric acid, acetic acid, sulfuric acid, and hydrofluoric acid, and can be used in an amount to promote the gelation of the silica sol to be followed.

Step 2)

The step 2) is a step for impregnating the silica sol in a blanket base material and then subjecting the impregnated silica sol to gelation to produce a silica wet gel blanket, and can be performed by adding a basic catalyst to the silica sol of the step 1), followed by impregnating the silica sol added with the basic catalyst in a blanket base material.

In the present invention, gelation can form a network structure from a silica precursor material, wherein the network structure can be a planar mesh structure in which specific polygons having one or more types of atomic arrangement are linked to each other, or a structure in which specific polyhedrons share their vertices, edges, faces, and the like with each other to form a three-dimensional skeleton structure.

The basic catalyst which can be used to induce the gelation reaction serves to promote gelation by increasing the pH of the silica sol.

The basic catalyst can be an inorganic base such as sodium hydroxide and potassium hydroxide; or an organic base such as ammonium hydroxide. However, in the case of an inorganic base, a metal ion included in a compound can be coordinated to a Si—OH compound. Thus, an organic base can be preferred.

Specifically, the organic base can be ammonium hydroxide ($NH_4OH$), tetramethylammonium hydroxide (TMAH), tetraethyl ammonium hydroxide (TEAH), tetrapropyl-ammonium hydroxide (TPAH), tetrabutylammonium hydroxide (TBAH), methylamine, ethylamine, isopropylamine, monoisopropylamine, diethylamine, diisopropylamine, dibutylamine, trimethylamine, triethylamine, triisopropylamine, tributylamine, choline, monoethanol-amine, diethanolamine, 2-aminoethanol, 2-(ethylamino)-ethanol, 2-(methylamino) ethanol, N-methyldiethanolamine, dimethylaminoethanol, diethylaminoethanol, nitrilo-triethanol, 2-(2-aminoethoxy) ethanol, 1-amino-2-propanol, triethanolamine, monopropanolamine, or dibutanol, and a mixture of two or more thereof can be used. More specifically, the base can be ammonium hydroxide ($NH_4OH$).

The basic catalyst can be included in an amount such that the pH of the silica sol becomes 4 to 8. If the pH of the silica sol is out of the above range, gelation is not easily achieved, or a gelation rate becomes too slow, thereby deteriorating the processability. In addition, since the base can be precipitated when added in a solid phase, it can be preferable that the base is added in the form of a solution diluted with the alcohol (a polar organic solvent) of the step 1).

As described above, ammonia generated from the basic catalyst used in the gelation step can react with carbon dioxide in the line filter and generate a salt through the supercritical drying method of the present invention.

The gelation of the silica sol can occur in a state in which the silica sol is impregnated in the blanket base material.

The impregnation can be performed in a reaction vessel capable of accommodating a blanket base material, and can be performed by pouring a silica sol into the reaction vessel, or by placing a blanket base material in a reaction vessel having a silica sol to be soaked. At this time, in order to improve the bonding of the blanket base material and the silica sol, the blanket base material can be lightly pressed down to be sufficiently impregnated. Thereafter, the blanket base material can be pressed to a predetermined thickness at a constant pressure to remove the remaining silica sol, so that drying time can be reduced.

The blanket base material can be a film, a sheet, a net, a fiber, a porous body, a foam, a non-woven body, or a laminate of two or more layers thereof. Also, according to the use of a blanket base material, surface roughness can be formed or patterned on the surface thereof. Specifically, the blanket base material can be a fiber capable of further improving heat insulation performance by including a space or a void through which a silica aerogel can be easily inserted into the blanket base material.

Specifically, the blanket base material can be polyamide, polybenzimidazole, polyaramid, an acryl resin, a phenol resin, polyester, polyetheretherketone (PEEK), polyolefin (polyethylene, polypropylene, or a copolymer thereof, and the like), cellulose, carbon, cotton, wool, hemp, a non-woven fabric, a glass fiber, or ceramic wool, and the like.

According to an embodiment of the present invention, an aging step can be further included after the step 2).

The aging is an optional step in which a silica wet gel blanket is left to stand at a suitable temperature to allow the chemical change thereof to be completely achieved, thereby forming the network structure more firmly and enhancing mechanical stability.

The aging step of the present invention can be performed by placing a basic catalyst such as sodium hydroxide (NaOH), potassium hydroxide (KOH), ammonium hydroxide ($NH_4OH$), triethylamine, pyridine, and the like in a solution, which is diluted to 1-10% concentration in an organic solvent, for 1-10 hours at a temperature of 50-90° C. The organic solvent can be the alcohol (a polar organic solvent) described in the step 1).

As described above, ammonia generated from the basic catalyst used in the aging step can react with carbon dioxide in the line filter and generate a salt through the supercritical drying method of the present invention.

Step 3)

The step 3) is for subjecting the silica wet gel blanket to surface modification, and can be a step for hydrophobizing the silica wet gel blanket with a surface modifier. Specifically, the step can be performed by bonding a hydrophobic group derived from the surface modifier to the surface of the silica wet gel.

In the silica aerogel blanket, a silanol group (Si—OH) is present on the surface of the silica, and the silanol group absorbs water in the air due to the hydrophilic properties thereof, so that there is a disadvantage in that thermal conductivity is gradually increased. Therefore, in order to suppress the absorption of moisture in the air to maintain a low thermal conductivity, there is a need for modifying the surface of the silica aerogel to be hydrophobic in advance.

The surface modifier of the present invention can be a silane-based compound, a siloxane-based compound, a silanol-based compound, a silazane-based compound, or a combination thereof.

Specifically, the surface modifier can be a silane-based compound such as trimethylchlorosilane (TMCS), dimethyl dimethoxy silane, dimethyl diethoxy silane, methyl trimethoxy silane, trimethyl ethoxy silane, vinyl trimethoxy silane, ethyl triethoxy silane, phenyl triethoxy silane, phenyl trimethoxy silane, tetraethoxy silane, dimethyl dichloro silane, and 3-aminopropyl triethoxy silane, a siloxane-based compound such as polydimethyl siloxane, polydiethyl siloxane, and octamethyl cyclotetra siloxane, a silanol compound such as trimethylsilanol, triethylsilanol, triphenylsilanol, and t-butyldimethylsilanol, a silazane-based compound such as 1,2-diethyldisilazane, 1,1,2,2-tetramethyldisilazane, 1,1,3,3-tetramethyl disilazane, 1,1,1,2,2,2-hexamethyldisilazane (HMDS), 1,1,2,2-tetraethyldisilazane, 1,2-diisopropyldisilazane, or a combination thereof. Specifically, the surface modifier can be hexamethyldisilazane.

Particularly, when a silazane-based compound is used as the surface modifier, ammonia is generated therefrom, and the ammonia can react with carbon dioxide in a line filter and generate a salt through the supercritical drying method of the present invention.

The surface modifier can be used in the form of a solution diluted in an organic solvent, and the organic solvent can be the alcohol (polar organic solvent) described above in the step 1), wherein the surface modifier can be diluted to 1-10% by volume based on the total volume of a dilution solution.

In addition, the surface modifier can be added such that the amount thereof is 0.01-10 volume % based on the silica wet gel. When the additional amount of the surface modifier based on the silica wet gel is less than 0.01 vol %, the amount of the surface modifier which can react with the silanol group (Si—OH) in the silica wet gel is relatively small, so that the surface modification reactivity is reduced, and the surface modification may not be easily achieved. Thus, when performing drying, the silanol group not surface-modified may cause a condensation reaction, resulting in a problem in that a silica aerogel finally produced has a reduced pore size and may not achieve porosity. In addition, when the additional amount of the surface modifier based on the silica wet gel is greater than 10 vol %, a large amount of residual surface modifier which does not participate in the surface modification reaction can be present, resulting in a problem in that the surface modifier which is expensive is wasted, thereby deteriorating economic feasibility.

The step 3) can be performed by adding a surface modifier at a temperature of 50-90° ° C., preferably 50-70° C. for 1-10 hours.

Step 4)

The step 4) is for subjecting the surface-modified silica wet gel blanket to supercritical drying, wherein the supercritical drying is performed by the supercritical drying method described above.

The detailed description of the supercritical drying method for a silica wet gel blanket is the same as described above.

Meanwhile, the method for producing a silica aerogel blanket according to an embodiment of the present invention can further perform a washing step before the supercritical drying step. The washing step is to remove impurities and residual ammonia generated during a reaction to obtain a high-purity hydrophobic silica aerogel, and can be performed by a dilution process or an exchange process using a non-polar organic solvent.

Step 5)

The method for producing a silica aerogel blanket of the present invention can further include exposing the silica wet gel blanket which has been subjected to supercritical drying to a reduced oxygen atmosphere at a temperature of 300° ° C. or higher 5) after the step 4).

The step 5) is a step for performing heat treatment by exposing the silica wet gel blanket which has been subjected to supercritical drying to a reduced oxygen atmosphere at a temperature of 300° C. or higher, and can be additionally performed to reduce or stabilize the hydrocarbon fuel content of silica wet gel blanket.

The heat treatment can occur in a reduced oxygen atmosphere. The reduced oxygen atmosphere means an atmosphere including oxygen in 10 vol % or less, and can include an atmosphere of positive pressure with the increased concentration of inert gases including nitrogen, argon, helium, neon, argon, and xenon. The reduced oxygen atmosphere can also include a vacuum atmosphere having a reduced oxygen concentration by including vacuum or partial vacuum. The reduced oxygen atmosphere can further include an atmosphere contained in a sealed container in which limited combustion consumes a portion of the oxygen content in the closed atmosphere.

The reduced oxygen atmosphere can include 10 vol % oxygen or less, 8 vol % oxygen or less, 6 vol % oxygen or less, 5 vol % oxygen or less, 4 vol % oxygen or less, 3 vol % oxygen or less, 2 vol % oxygen or less, or less than 1 vol % oxygen. In addition, the reduced oxygen atmosphere can include 0.1-10 vol % oxygen, 0.1-5 vol % oxygen, 0.1-3 vol % oxygen, 0.2-2 vol % oxygen, or 0.1-1 vol % oxygen.

The heat treatment temperature can be 300-950° ° C., 300-900° C., 300-850° C., 300-800° ° C., 300-750° ° C., 300-700° ° C., 300-650° ° C., or 300-600° C.

The heat treatment duration can be 3 hours or more, 10 seconds to 3 hours, 10 seconds to 2 hours, 10 seconds to 1 hour, 10 seconds to 45 minutes, 10 seconds to 30 minutes, 10 seconds to 15 minutes, 10 seconds to 5 minutes, 10 seconds to 1 minute, 1 minute to 3 hours, 1 minute to 1 hour, 1 minute to 45 minutes, 1 minute to 30 minutes, 1 minute to 15 minutes, 1 minute to 5 minutes, 10 minutes to 3 hours, 10 minutes to 1 hour, 10 minutes to 45 minutes, 10 minutes to 30 minutes, 10 minutes to 15 minutes, 30 minutes to 3 hours, 30 minutes to 1 hour, 30 minutes to 45 minutes, 45 minutes to 3 hours, 45 minutes to 90 minutes, 45 minutes to 60 minutes, 1 hour to 3 hours, 1 hour to 2 hours, 1 hour to 90 minutes, or duration in a range between any two values thereof.

Specifically, the heat treatment can be performed in a reduced oxygen atmosphere including about 95% to 99.9% of an inert gas at a temperature of about 200-800° ° C. for about 1 minute to about 3 hours, or at a temperature of 300-650° ° C. for about 30 seconds to 200 minutes, or at a temperature of 300-650° ° C. for about 30 seconds to 200 minutes.

Drying Device for Silica Aerogel Blanket

The present invention provides a supercritical drying device including a supercritical extractor in which supercritical drying is performed, a line filter connected to the supercritical extractor, and a pressure control valve connected to the line filter. An exemplary embodiment is shown in FIG. 1. As depicted in FIG. 1, a line filter that can be cooled is installed between the supercritical extractor and a pressure control valve, such as a Back Pressure Regulator (BPR). After the supercritical drying of a silica wet gel blanket in the supercritical extractor, residual materials discharged from the supercritical extractor, for example, carbon dioxide in a supercritical state, ammonia released from inside a gel, a solvent replaced by carbon dioxide during the supercritical drying, water, and the like are discharged from the supercritical extractor and flow along a line, through the cooled line filter, and to the pressure control valve. While passing through the pressure control valve, carbon dioxide is changed from being in a supercritical state to be in a gaseous state and is discharged. The solvent, such as an alcohol (a polar organic solvent) can be recovered in a separator. A salt generated from residual materials discharged from the supercritical extractor are filtered in the cooled line filter before reaching the pressure control valve, and thus, the salt is prevented from being accumulated in the pressure control valve or other pipes. The description of the line filter is the same as described above.

Specifically, the line filter includes a filtration membrane for filtering a salt, wherein the average pore diameter of the filtration membrane can be 1-100 μm, preferably 10-90 μm, and more preferably 20-50 μm, and the outer surface temperature of the line filter can be 0-50° C., 0-30° C., preferably 0-20° C., and more preferably 0-15° C.

The supercritical drying device of the present invention is characterized by further including a line filter in order to induce the generation and filtration of a salt, and is a device capable of performing supercritical drying safely and efficiently since a salt is not accumulated inside pipes of other types included in the supercritical drying device.

EXAMPLES

Hereinafter, the present invention will be described in detail with reference to Examples. However, the following Examples are merely illustrative of the present invention and are not intended to limit the scope of the present invention.

Example 1

1) Preparing Silica Wet Gel Blanket Roll

75% hydrated tetraethylorthosilicate (HTEOS) (silica concentration 19-20 wt %), ethanol, and water were mixed in a weight ratio of 1:2.25:0.35 to prepare a silica sol. The silica sol was added with 0.44 wt % of a basic catalyst solution based on the HTEOS, in which ethanol and ammonia water were mixed in a weight ratio of 210:1, and the silica sol added with the solution was impregnated in glass fiber to induce gelation. After the completion of the gelation, the silica sol subjected to gelation was aged by being left to stand using 80-90 vol % of an ammonia solution (2-3 vol %) based on the silica sol at a temperature of 50-70° C. for 1 hour. Thereafter, the aged silica sol was aged again by being left to stand using 80-90 vol % of a hexamethyldisilazane (HMDS) solution (2-10 vol %) based on the silica sol at a temperature of 50-70° ° C. for 4 hours.

2) Supercritical Drying of Silica Wet Gel Blanket Roll

The silica wet gel blanket roll was placed in a supercritical extractor, and supercritical drying was performed for 6 hours at 60° C. and 100 bar. A filtration membrane included in a line filter was one having an average pore diameter of 50 μm, and the line filter was cooled to maintain the outer surface temperature thereof at 10° C. The supercritical drying was completed and then ethanol was recovered. Additional drying was performed for 1 hour under the conditions of atmospheric pressure and 50° ° C. to produce a silica aerogel blanket.

Example 2

Supercritical drying was performed in the same manner as in Example 1, except that the outer surface temperature of the line filter was set to 35-38° C.

Comparative Example 1

Supercritical drying was performed in the same manner as in Example 1, except that a line filter was not used.

Experimental Example 1

After completing the supercritical drying of each of Examples 1 and 2 and Comparative Example 1, a salt accumulated inside the line filter and the pressure control valve was visually observed.

Figure 2:
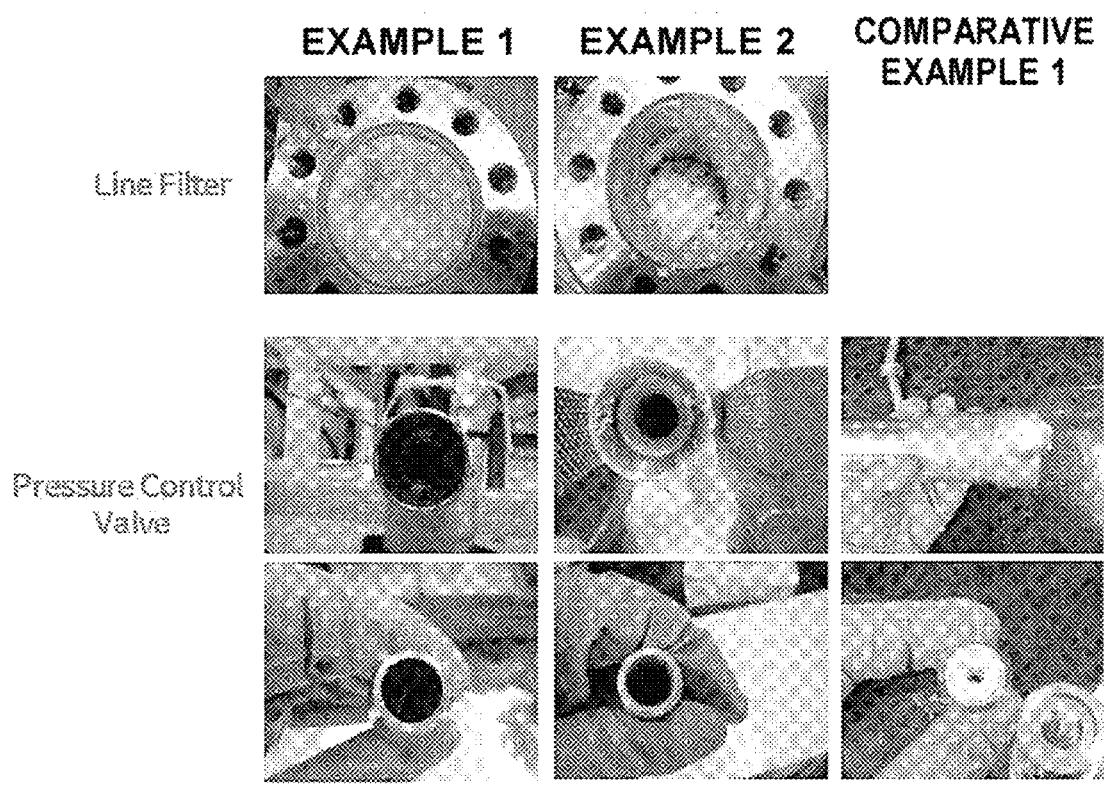
FIG. 2 shows the amount of salt generated in a line filter and in a pressure control valve during the supercritical drying step of each of Examples and Comparative Examples of the present invention.

As shown in FIG. 2, in the case of Examples 1 and 2, a large amount of salt was accumulated inside the line filter. Particularly, in the case of Example 1 in which the temperature of the line filter was reduced to promote the generation of salt, even more amount of salt was confirmed to be present in the filtration membrane.

After observing a line of the pressure control valve based on the above results, almost no salt was observed in Examples 1 and 2, and especially in the case of Example 1, the inside of the line was observed to be clean. On the contrary, in the case of Comparative Example 1 in which a line filter was not used, a large amount of salt was observed to be accumulated inside of the line of the pressure control valve.

Experimental Example 2

The amount of ammonium ions remaining in ethanol recovered was measured using ion chromatography.

TABLE 1

|  | Ammonium ions remaining in ethanol (mg/kg) |
|---|---|
| Example 1 | 50 |
| Example 2 | 115 |
| Comparative Example 1 | 330 |

As shown in Table 1, in the case of Comparative Example 1 in which the supercritical drying process was performed without using a line filter, a large amount of ammonium ions was confirmed to remain in the recovered ethanol.

In the case of Example 2, it was confirmed that the content of ammonium ions remaining in ethanol was significantly reduced to less than half when compared with Comparative Example 1 by introducing a line filter. In addition, in the case of Example 1 in which the temperature of the line filter was lowered to 10° C. to further promote the generation of salt, the content of ammonium ions was significantly reduced compared with Example 2.

In summary, by introducing a line filter, the generation of salt was promoted in the line filter, thereby greatly reducing the content of ammonium salt remaining in the ethanol recovered after filtration. The above effect was found to be further promoted when the operating temperature of the line filter was lowered.

The invention claimed is:

1. A supercritical drying method for a silica wet gel blanket, the method comprising:
    a) placing the silica wet gel blanket inside a supercritical extractor;
    b) subjecting the silica wet gel blanket to supercritical drying and discharging residual materials from the supercritical extractor; and
    c) injecting the residual materials into a line filter having an outer surface temperature in a range of 0° C.-50° C. installed between the supercritical extractor and a pressure control valve to form a filtered residual material, and then discharging the filtered residual material,
    wherein the step b) and the step c) are sequentially or simultaneously performed, and
    the step c) is filtering a salt generated by a reaction among the residual materials inside the line filter.

2. The supercritical drying method of claim 1, wherein the line filter of the step c) comprises a filtration membrane for filtering a salt, and an average pore diameter of the filtration membrane is 1-100 µm.

3. The supercritical drying method of claim 1, wherein the residual materials of the step c) comprise ammonia, carbon dioxide, a solvent, and water.

4. The supercritical drying method of claim 3, wherein the salt to be filtered in the step c) is produced by a reaction among ammonia, carbon dioxide, and water.

5. The supercritical drying method of claim 1, wherein the amount of the ammonium ions ($NH_4^+$) included in a solvent recovered after completing the supercritical drying method is 30-300 mg/kg.

6. A method for producing a silica aerogel blanket, the method comprising:
    1) Preparing a silica sol;
    2) Impregnating the silica sol in a blanket base material and then subjecting the impregnated silica sol to gelation to produce a silica wet gel blanket;
    3) Subjecting the silica wet gel blanket to surface modification; and
    4) Subjecting the surface-modified silica wet gel blanket to supercritical drying, wherein the supercritical drying is performed by the method of claim 1.

7. The method of claim 6, further comprising,
    after the step 4), 5) exposing a product of the step 4) to a reduced oxygen atmosphere at a temperature of 300° C. or higher.

* * * * *